United States Patent [19]
Yamada et al.

[11] Patent Number: 5,355,853
[45] Date of Patent: Oct. 18, 1994

[54] KNOCK CONTROL SYSTEM FOR INTERNAL COMBUSTION ENGINE

[75] Inventors: Hirohiko Yamada, Anjo; Koji Sakakibara, Hekinan, both of Japan

[73] Assignee: Nippondenso Co., Ltd., Kariya, Japan

[21] Appl. No.: 31,245

[22] Filed: Mar. 11, 1993

[30] Foreign Application Priority Data

Mar. 12, 1992 [JP] Japan ................... 4-53744

[51] Int. Cl.$^5$ ............................................. F02P 5/14
[52] U.S. Cl. .................... 123/425; 123/422
[58] Field of Search ................ 123/425, 422, 435; 73/35

[56] References Cited

U.S. PATENT DOCUMENTS

| | | | |
|---|---|---|---|
| 4,617,895 | 10/1986 | Sakakibara et al. | 123/425 |
| 4,993,387 | 2/1991 | Sakakibara et al. | 123/425 |
| 5,245,969 | 9/1993 | Nishiyama et al. | 123/422 |
| 5,263,451 | 11/1993 | Andreasson | 123/425 |
| 5,263,452 | 11/1993 | Oshawa et al. | 123/425 |
| 5,265,574 | 11/1993 | Phillipp et al. | 123/422 |

FOREIGN PATENT DOCUMENTS 60-243369 12/1985 Japan .
1315649 12/1989 Japan .

*Primary Examiner*—Raymond A. Nelli
*Attorney, Agent, or Firm*—Cushman, Darby & Cushman

[57] ABSTRACT

A knock control system for an internal combustion engine derives a knock intensity indicative value Vpi from an output of a knock sensor and decides presence or absence of an engine knock by comparing the knock intensity indicative value Vpi and a knock decision level $V_{KDi}$ for controlling a knock control factor such as an ignition timing based on the decision. The system derives a value Si corresponding to a standard deviation of a distribution of a substantially logarithmic conversion value of the knock intensity indicative value Vpi, and a value $V_{Mi}$ corresponding to a median value of the above-noted distribution. The system derives the knock decision level $V_{KDi}$ based on the value Si and the value $V_{Mi}$ when the value Si is within a predetermined range. On the other hand, when the value Si deviates from the predetermined range, the system derives the knock decision level $V_{KDi}$ based on the value $V_{Mi}$ and a corrected value which is set smaller or larger than the value Si so as to prevent divergence of the knock decision level $V_{KDi}$.

8 Claims, 8 Drawing Sheets

KNOCK CONTROL SYSTEM FOR INTERNAL COMBUSTION ENGINE

BACKGROUND OF THE INVENTION

1. Field Of the Invention

The present invention relates to a knock control system for an internal combustion engine for detecting a knock generated in the engine and controlling knock control factors, such as, an ignition timing and an air-fuel ratio of the mixture gas to be supplied to the engine, depending on the detected knock condition in the engine.

2. Description of the Prior Art

A knock control system for an internal combustion engine has been proposed as disclosed in such as U.S. Pat. No. 4,993,387. In system, a knock criterion level or a knock decision level $V_{KD}$ is derived based on a standard deviation $\sigma$ of a substantially logarithmic conversion value of a knock intensity value V detected by a knock sensor. Specifically, the knock decision level $V_{KD}$ is derived by an equation of $V_{KD}=S^3 \cdot V_M$, wherein S represents a value corresponding to the standard deviation $\sigma$ of the normal distribution of the substantially logarithmic conversion value (hereinafter also referred to as "log(V)") of the knock intensity value V, and $V_M$ represents a value corresponding to a median value of the log(V) normal distribution.

The system determines in every routine cycle whether the detected knock intensity value V is between $V_M/S$ and $V_M(V_M/S \leq V \leq V_M)$ and updates the value S such that a probability of satisfying $V_M/S \leq V \leq V_M$ becomes one third (about 33%). This means that the value S corresponds to $1\sigma$, i.e. $\sigma \approx \log(S)$, wherein $\sigma$ represents the standard deviation of the log(V) normal distribution. The system further updates the value $V_M$ based on a decision whether the detected knock intensity value V is above or below the value $V_M$ to converge the knock intensity values V greater than the value $V_M$ and those less than the value $V_M$ to 50%, respectively, so that the value $V_M$ continues to correspond to the media value of the log(V) normal distribution.

As a result, the conventional system can absorb differences in characteristics of individual knock sensors used and in engine types, time-dependent variation in characteristics of the used engine and knock sensor, and variation in engine speed and load, which respectively affect characteristics of the knock sensor signals V, by deriving the knock decision level $V_{KD}$ based on the value S (representing the standard deviation $\sigma$ of the log(V) normal distribution) and the value $V_M$ (representing the media value of the log(V) normal distribution) which are sequentially updated using the detected knock sensor signals V. Accordingly, the system is capable of providing a reliable knock detection without being adversely affected by the above-noted difference and variation.

However, when a knock sound happens to become extremely large or a knock is concentrated to a particular cylinder of a multi-cylinder engine, the distribution of the knock intensity value V is largely disturbed or disordered due to knock-related components included in the knock sensor signal so that the value S is caused to be increased. As a result, the knock decision level $V_{KD}$ is also increased to induce more engine knocking, which, in turn, further increases the value S to further increase the knock decision level $V_{KD}$, leading to divergence of the value S and the knock decision level $V_{KD}$.

The grounds for the divergence of the value S will be explained hereinbelow with reference to FIGS. 12, 13 and 14.

As shown in FIG. 12, the distribution of log(V) becomes normal distribution which is symmetrical with respect to the media value log($V_M$) when no knock-related components are included in the knock sensor signal V. On the other hand, when a knock is generated, large magnitudes of the knock intensity values V reflect on the log(V) distribution so that the right end of the log(V) distribution deviate from the normal distribution, as shown in FIG. 13. In general, as the generated knock gets larger, the disturbance on the right side of the log(V) distribution also gets larger, while the disturbance on the left side of the distribution does not occur as often under the normal engine knocking. However, when a magnitude of the knock happens to increase abruptly or when the knock is concentrated to a particular cylinder, i.e. the knock is not equally distributed among the cylinders, it is possible that the left side of the distribution is also disturbed, as shown in FIG. 14.

Since the foregoing conventional system updates the value S by maintaining the probability of $V_M/S \leq V \leq V_M$ at one third (about 33%), when the left side of the log(V) distribution is disturbed as shown in FIG. 14, the value S corresponding to the standard deviation $\sigma$ of the log(V) distribution is also necessarily increased to realize a cumulative relative frequency of $\log(V_M/S) \leq \log(V) \leq \log(V_M)$ in the log(V) distribution as being one third (about 33%). In other words, the value S is necessarily increased since the standard deviation $\sigma$ of the log(V) distribution is increased ($\sigma \approx \log(S)$).

SUMMARY OF THE INVENTION

Therefore, it is an object of the present invention to provide an improved knock control system for an internal combustion engine that eliminates the above-noted defects inherent in conventional knock control system.

To accomplish the above-mentioned and other objects, according to one aspect of the present invention, a knock control system for an internal combustion engine comprises a knock sensor for detecting a knock of the engine; means for deriving a knock intensity value effective for knock detection from a signal produced by the knock sensor; means for deciding presence or absence of the engine knock by comparing the knock intensity value with a knock decision level; means for controlling a knock control factor based on a result of the decision by the knock decision means; means for deriving a first value corresponding to a standard deviation of a distribution of a substantially logarithmic conversion value of the knock intensity value; means for deriving a second value corresponding to a predetermined cumulative relative frequency of the distribution of the substantially logarithmic conversion value of the knock intensity value; first knock decision level deriving means for deriving the knock decision level based on the first and second values when the first value is within an allowable range identified by a criterion value; and second knock decision level deriving means for deriving the knock decision level based on the second value and a third value derived by subtracting a balance between the first value and the criterion value from the criterion value when the first value deviates from the allowable range.

According to another aspect of the present invention, a knock control system for an internal combustion engine comprises a knock sensor for detecting a knock of the engine; means for deriving a knock intensity value effective for knock detection from a signal produced by the knock sensor; means for deciding presence or absence of the engine knock by comparing the knock intensity value with a knock decision level per engine cylinder: means for controlling a knock control factor based on a result of the decision by the knock decision means: means for deriving a first value, per engine cylinder, which corresponds to a standard deviation of a distribution of a substantially logarithmic conversion value of the knock intensity value; means for deriving a second value, per engine cylinder, which corresponds to a predetermined cumulative relative frequency of the distribution of the substantially logarithmic conversion value of the knock intensity value: first knock decision level deriving means for deriving the knock decision level, per engine cylinder, based on the first and second values when the first value is within an allowable dispersion range of the first values for the respective engine cylinders; and second knock decision level deriving means for deriving the knock decision level based on the second value and a third value corrected in a manner to fall within the allowable dispersion range when the first value deviates from said allowable dispersion range.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

The disclosure of U.S. Pat. No. 4,993,387 is incorporated herein by reference.

Figure 1:
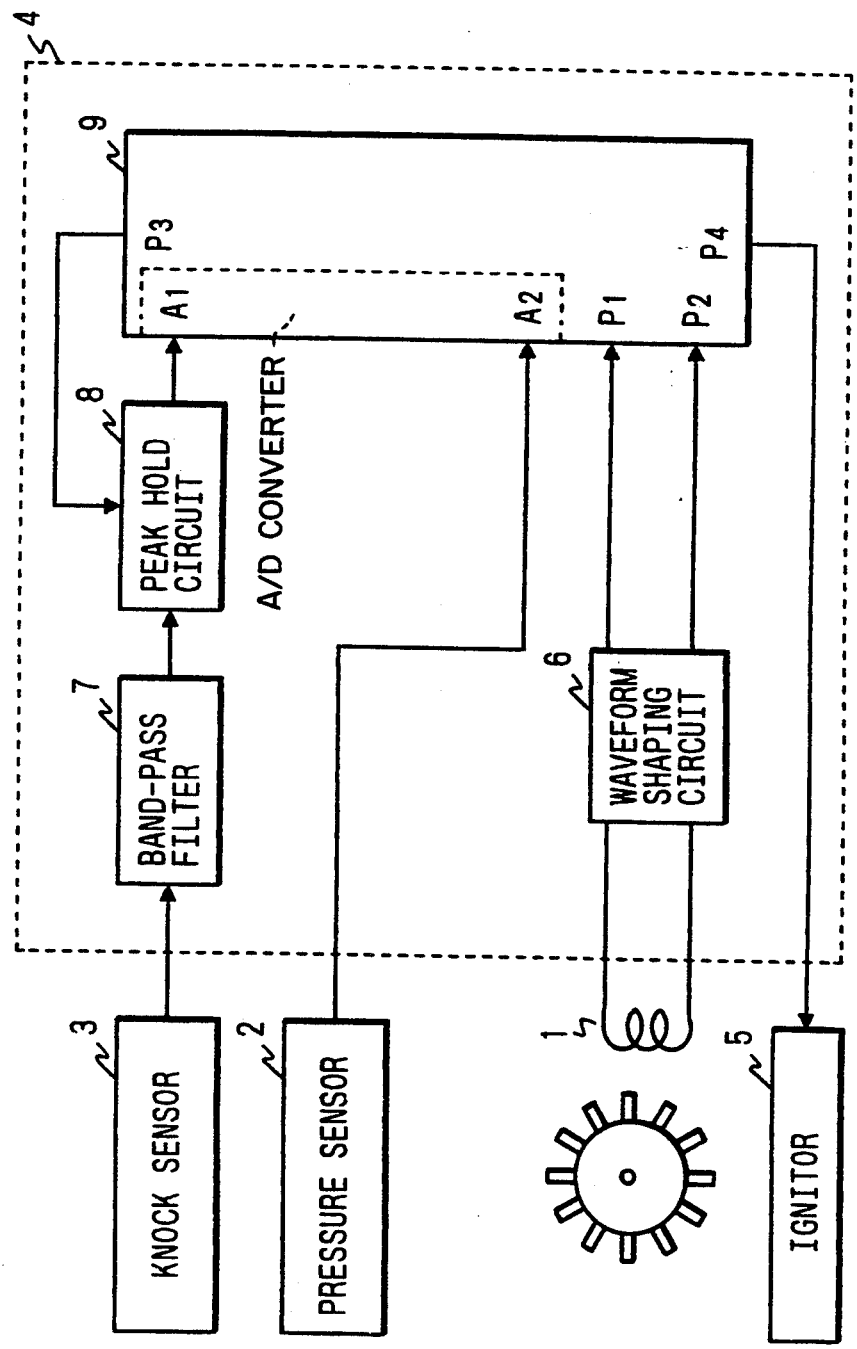
FIG. 1 is a block diagram showing an entire knock control system for an internal combustion engine according to a first preferred embodiment of the present invention.

Referring now to the drawings, FIG. 1 shows an entire knock control system for internal combustion engine according to a first preferred embodiment of the present invention.

In FIG. 1, a crank angle sensor 1 includes such as an electromagnetic pickup and produces signals indicative of unit angle data for engine speed and reference angle data for a piston position for each engine cylinder. A pressure sensor 2 produces a signal indicative of engine intake manifold vacuum pressure data. A knock sensor 3 having a piezoelectric element is fixed to a cylinder block by screws for producing a signal indicative of engine vibration data. The knock sensor 3 is used for detecting an engine knocking.

An electronic control unit (hereinafter referred to as "ECU") 4 receives signals from various sensors including the foregoing sensors so as to control an ignition timing of the engine through an igniter 5 connected to the ECU 4. The igniter 5 receives a control signal from the ECU 4 for opening and closing a circuit for the current to be fed to a primary coil of an ignition coil.

The ECU 4 includes a waveform shaping circuit 6, a band-pass filter 7, a peak hold circuit 8 and a microcomputer 9. The waveform shaping circuit 6 shapes a waveform of the signal from the crank angle sensor (the pickup) 1 and sends the unit angle indicative pulse signal (for example, per 30° CA) and the reference angle indicative signal (for example, per 10° CA BTDC for each engine cylinder) to the microcomputer 9. The band-pass filter 7 filters the signal from the knock sensor 3 to extract a knock-related component within a preset frequency band (generally 7–8 KHz) which is necessary for knock detection. The peak hold circuit 8 pea-holds the output signal from the band-pass filter 7 to derive a maximum value of the signal within a predetermined crank angle for every ignition. The microcomputer 9 includes an 8-bit or 16-bit microprocessor.

Input/output circuits of the microcomputer include digital ports $P_1$ to $P_4$ for digital signals in the form of high and low levels and A/D (analog-to-digital) converting ports $A_1$ and $A_2$ (A/D converter) for converting input analog signals into corresponding digital signals. In this preferred embodiment, the output signals (the reference angle signal and the unit angle signal) from the waveform shaping circuit 6 are supplied to the digital ports $P_1$ and $P_2$, and the output signals from the peak hold circuit 8 and the pressure sensor 2 to the A/D converting ports $A_1$ and $A_2$, respectively. The digital port $P_3$ is used to reset the peak hold circuit 8 at a given timing for deriving a peak hold value, i.e. the maximum value of the signal from the band-pass filter 7 per ignition. The digital port P4 is used for controlling the operation of the igniter 5.

Since the entire system for electronically controlling the ignition timing of the engine based on the engine speed data and the engine manifold vacuum pressure data has been well known under the name of, for example, ESA (electronic spark advance), the following description will be limited to details of the knock control system according to the preferred embodiments of the present invention, which can work in the entire ignition timing control system.

Figure 2:
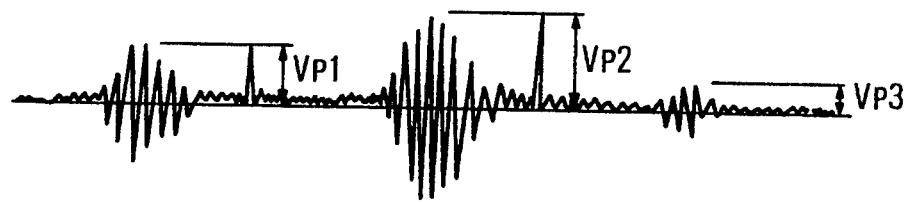
FIG. 2 is a diagram showing a signal from a knock sensor as having passed a band-pass filter and a manner of sapling a peak value of the filtered signal.

FIG. 2 shows the knock sensor output as having passed the band-pass filter 7. FIG. 2 also shows a manner of sampling a peak value, by the peak hold circuit 8, of the filtered signal. The peak hold circuit 8, in response to a control signal from the microcomputer 9, starts the peak hold operation from about 10° CA ATDC and is reset at about 90° CA ATDC. The peak hold values as identified by Vp1, Vp2 and Vp3 in FIG. 2 which are respectively held in the peak hold circuit 8 just before the respective resetting thereof, are read in by the microcomputer 9 in sequence. Accordingly, the peak value of the knock sensor signal within the predetermined crank angle (between 10° CA ATDC and 90° CA ATDC) for each ignition is fed to the microcomputer 9 via the A/D conversion port $A_1$.

Figure 3:
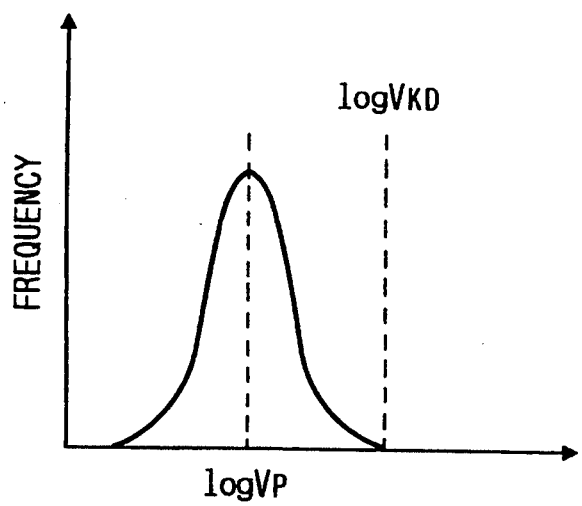
FIG. 3 is a diagram showing a distribution of a logarithmic conversion value of the peak value when no engine knock is generated.
Figure 4:
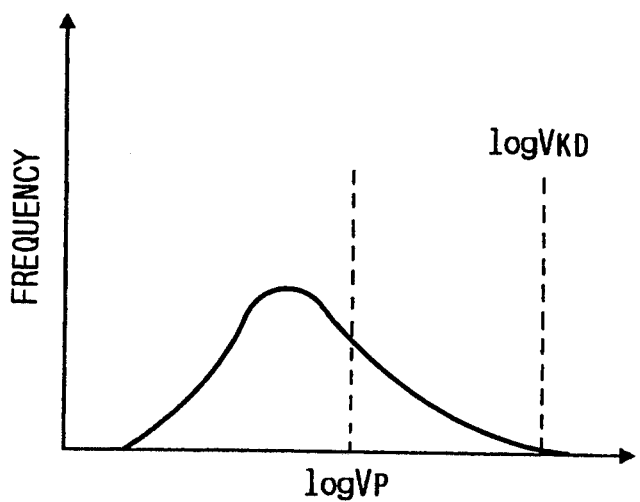
FIG. 4 is a diagram showing a distribution of the logarithmic conversion value of the peak value when an engine knock is generated.

FIG. 3 shows a distribution of a logarithmic-converted value log(Vp) of the peak hold value Vp (hereinafter also referred to as "the knock intensity value Vp") for one of the engine cylinders when no engine knocking is generated. As appreciated, the distribution of the value log(Vp) forms the normal distribution when no knock is generated. On the other hand, FIG. 4 shows a distribution of the value log(Vp) when the knock is generated. In each of FIGS. 3 and 4, the axis of ordinates represents a frequency or probability of the value log(Vp) and the axis of abscissas represents the value log(Vp). When the detected knock intensity value Vp exceeds a knock criterion value or a knock decision value $V_{KD}$, meaning that the value log(Vp) exceeds a value log($V_{KD}$) in FIG. 3 or FIG. 4, the engine knock is determined.

Now, operations of the knock control system as structured above will be described with reference to a flowchart of FIG. 5 which is executed by the microcomputer 9 per ignition.

At a first step 100, the knock intensity value Vpi is derived, wherein a subscript "i" represents the number of the corresponding engine cylinder and is assigned the number 1, 2, 3 or 4 when the engine is of a four-cylinder type. A subsequent step 110 determines presence or absence of the knock based on the derived knock intensity value Vpi. Specifically, the microcomputer 9 compares the knock intensity value Vpi with the knock decision level $V_{KDi}$. When the knock intensity value Vpi exceeds the knock decision level $V_{KDi}$, knock is determined. A subscript "i" of the knock decision level $V_{KDi}$ represents the number of the corresponding engine cylinder and is assigned the number 1, 2, 3 and 4 when the engine is four-cylinder engine.

When the step 110 determines the knock, the microcomputer 9 increases a retard angle R by a preset value ΔR (about 0.5° CA-1° CA). On the other hand, the knock is not determined at the step 110, the microcomputer 9 counts the number of times the decision of no engine knock that the step 110 has continuously produced. When this continuous number reaches a predetermined value, the retard angle R is decreased by the preset value ΔR (about 0.5° CA-1° CA). When this number has a negative value, the retard angle R is maintained as is.

Subsequently, a step 120 updates the value Si per cylinder which, as described before, corresponds to the standard deviation σ of the log(Vpi) distribution. A subscript "i" of the value Si represents the number of the corresponding engine cylinder and is assigned the number 1, 2, 3 or 4 when the engine is of a four-cylinder engine.

Figure 5:
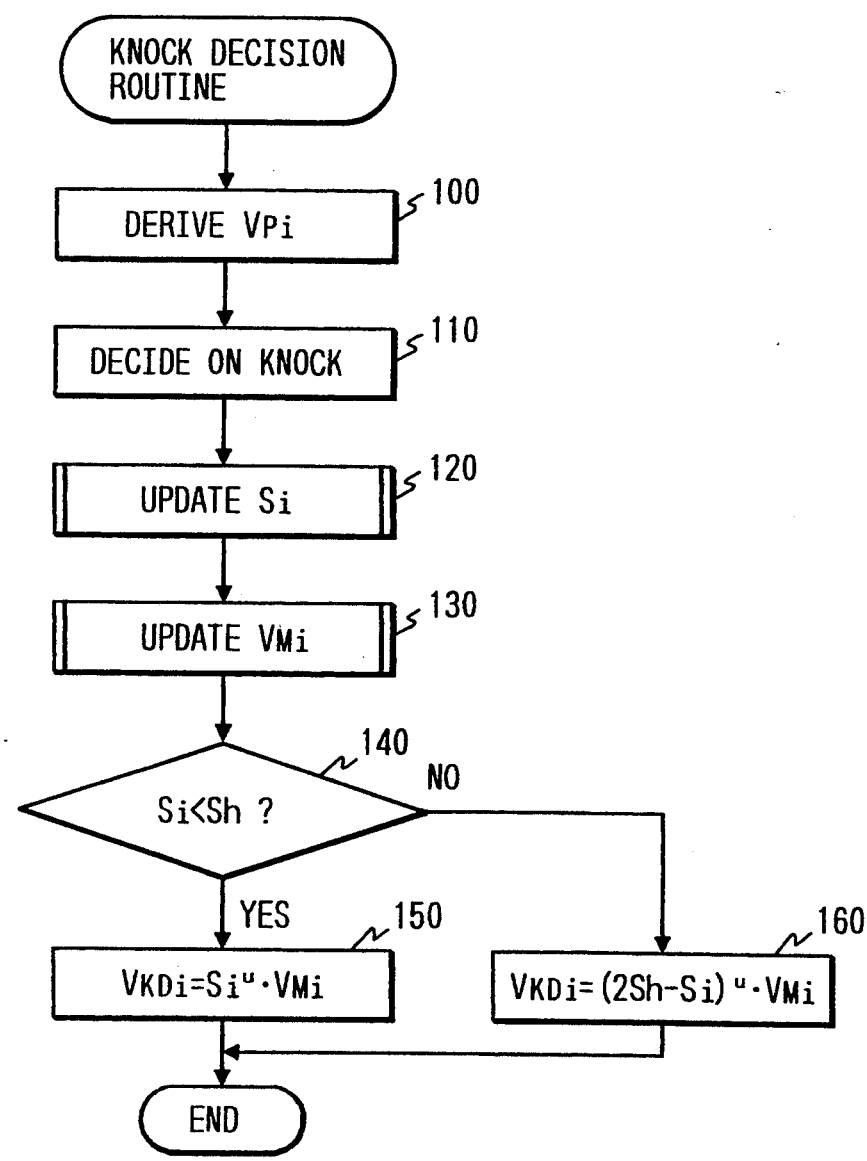
FIG. 5 is a flowchart showing a knock decision routine according to the first preferred embodiment of the present invention.
Figure 6:
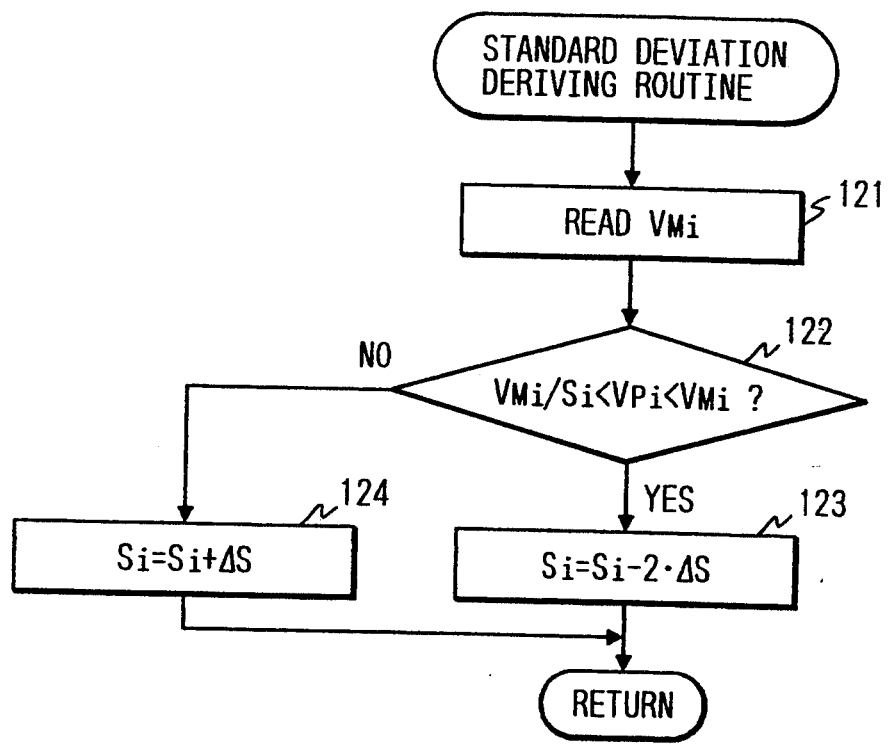
FIG. 6 is a flowchart showing a standard deviation deriving routine according to the first preferred embodiment of the present invention.

FIG. 6 shows a subroutine of the step 120 for updating the value Si. At a step 121, the value $V_{Mi}$ which corresponds to a median value of the log(Vpi) distribution and has been updated at a step 130 in FIG. 5 in a preceding execution cycle thereof for the same engine cylinder, is read in. A subscript "i" of the value $V_{Mi}$ represents the number of the corresponding engine cylinder and is assigned the number 1, 2, 3 or 4 when the engine is of a four-cylinder engine.

Subsequently, a step 122 checks whether the knock intensity value Vpi derived at the step 100 in FIG. 5 falls between $V_{Mi}$/Si and $V_{Mi}$($V_{Mi}$/Si≦Vpi≦$V_{Mi}$). If answer at step 122 is YES, then the routine proceeds to step 123 where the value Si is reduced by 2•ΔS (ΔS represents a preset value) as expressed by Si=Si−−2•ΔS. On the other hand, if answer at the step 122 is NO, then step 124 increases the value Si by ΔS as expressed by Si=Si+ΔS.

Figure 7:
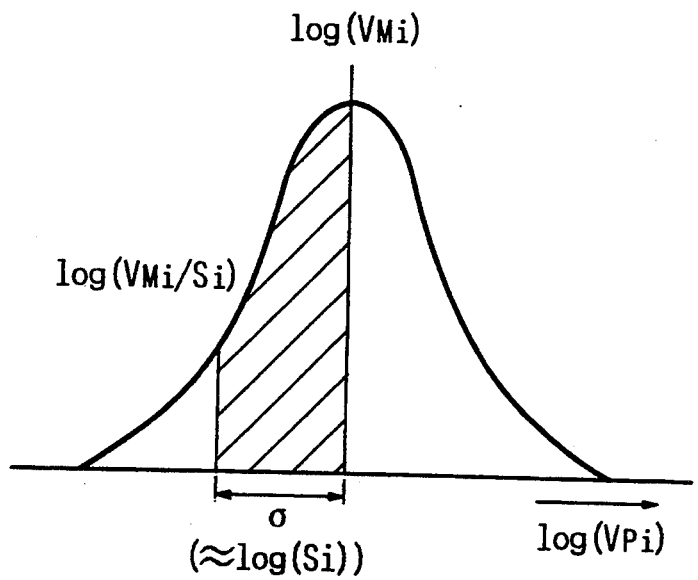
FIG. 7 is a diagram for explaining a relationship between a value Si and the standard deviation.

As a result, the value Si is updated such that a probability of satisfying $V_{Mi}$/Si≦Vpi≦$V_{Mi}$ becomes one third (about 33%). This means that, as shown in FIG. 7, the value Si corresponds to 1σ as expressed by σ≈log(Si), wherein σ represents the standard deviation of the log(Vpi) normal distribution.

Figure 8:
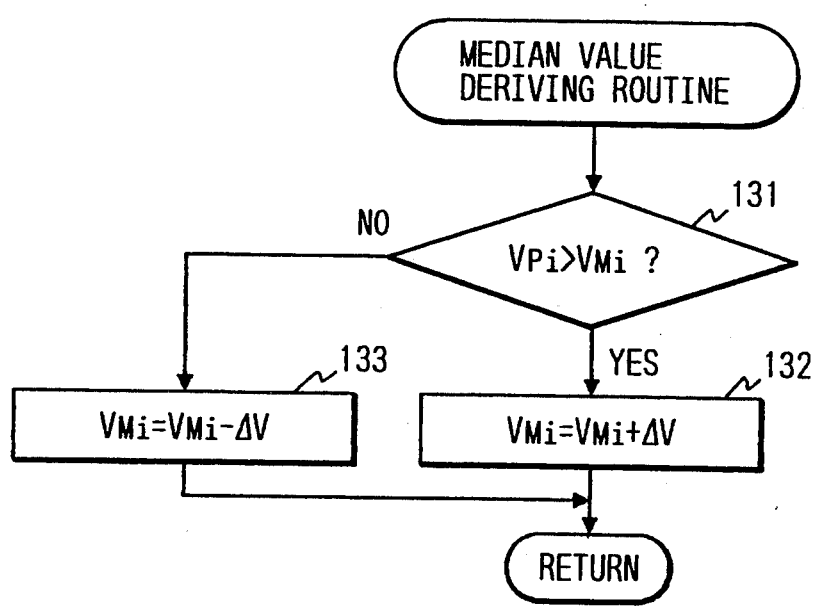
FIG. 8 is a flowchart showing a media value deriving routine according to the first preferred embodiment of the present invention.

Referring back to FIG. 5, step 130 updates the value $V_{Mi}$ corresponding to the media value of the log(Vpi) distribution. FIG. 8 shows a subroutine of step 130 for updating the value $V_{Mi}$ based on the knock intensity value Vpi derived at the step 100 in FIG. 5.

At a first step 131, the knock intensity value Vpi is compared with the value $V_{Mi}$. If answer at step 131 is YES, i.e. the knock intensity value Vpi is larger than the value $V_{Mi}$, the routine proceeds to step 132 where the value $V_{Mi}$ is increased by a preset value ΔV as expressed by $V_{Mi}$=$V_{Mi}$+ΔV. On the other hand, if answer at step 131 is NO, then step 133 reduces the value $V_{Mi}$ by the preset value ΔV as expressed by $V_{Mi}$=$V_{Mi}$−ΔV.

As a result, the knock intensity values Vpi greater than the value $V_{Mi}$ and less than the value $V_{Mi}$ are converged to 50%, respectively, so that the value $V_{Mi}$ continues to correspond to the median value of the log(Vpi) normal distribution. As appreciated, the value $V_{Mi}$ corresponds to a cumulative relative frequency of 50% in the log(Vpi) distribution.

Now, the routine proceeds to step 140, wherein the value Si updated at step 120 is compared with a preset criterion value Sh. The criterion value Sh may be preferably set to about 1.5 in view of a result of various experiments. If the answer at step 140 is YES, i.e. the value Si is less than the criterion value Sh, then it is judged that no divergence is predicted so that the knock decision level $V_{KDi}$ is derived in a normal manner at step 150. Specifically, step 150 derives the knock decision level $V_{KDi}$ using the following equation:

$$V_{KDi} = Si^u \cdot V_{mi}$$

wherein, "u" represents a constant and may be set, for example, to 3 (u=3).

On the other hand, when the answer at step 140 is NO, i.e. the value Si is not less than the criterion value Sh, then it is judged that the divergence is predicted so that a reduced value is used for deriving the knock decision level $V_{KDi}$ at a step 160. Specifically, the step 160 derives the knock decision level $V_{KDi}$ using the following equation:

$$V_{KDi} = (2Sh - Si)^u \bullet V_{Mi}$$

wherein, "u" represents a constant and may be set, for example, to 3 (u=3).

The value (2Sh−Si) is derived by subtracting a balance (Si−Sh) from the criterion value Sh.

As appreciated from the above description, the knock decision level $V_{KDi}$ is sequentially updated based on a prediction whether the value Si will diverge or not. Accordingly, even if the engine knock suddenly increases to diverge the value Si, since the knock decision level $V_{KDi}$ is corrected to be reduced at the step 160, the divergence of the value Si and thus the knock decision level $V_{KDi}$ is effectively prevented in advance.

Figure 9:
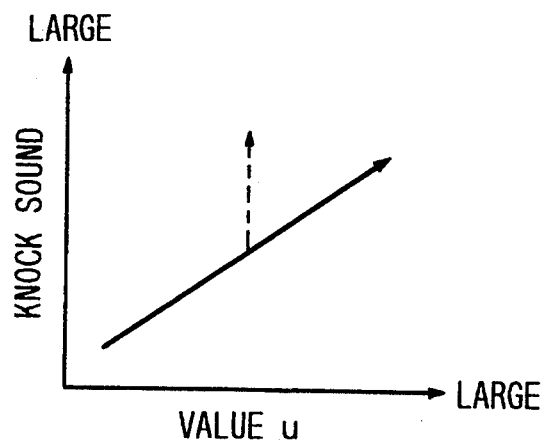
FIG. 9 is a diagram showing a relationship between a value u and a knock sound.

As shown in FIG. 9, the constant u used in deriving the knock decision level $V_{KDi}$ is a factor for determining a level of the knock sound. Accordingly, in theory, the value u can control the level of the knock sound. However, in the foregoing conventional system, when the knock increases to diverge the value Si, the knock decision level $V_{KDi}$ also diverges out of control by the value u, so that the level of the knock sound is out of control to increase to an extreme extent, as shown by a dotted line in FIG. 9.

On the other hand, in this preferred embodiment, as shown by a solid line in FIG. 9, the value u can control the level of the knock sound. Specifically, when the value Si increases to be subject to possibility of the divergence thereof, the knock decision level $V_{KDi}$ is corrected toward a reduced value to prevent the divergence of the value Si and thus the knock decision level $V_{KDi}$, so that the level of the knock sound is controlled by the value u.

As appreciated from the foregoing description, in this preferred embodiment, the microcomputer 9 derives the knock decision level $V_{KDi}$ based on the value Si (corresponding to the standard deviation σ of the log(Vpi) normal distribution) and the value $V_{Mi}$ (corresponding to the median value of the log(Vpi) normal distribution) when the value Si is within the predetermined range (Si<Sh). On the other hand, the microcomputer 9 derives the knock decision level $V_{KDi}$ based on the value (2Sh−Si) which is derived by subtracting the balance (Si−Sh) from the preset criterion value Sh, and the value $V_{Mi}$ when the value Si falls outside the predetermined range (Si<Sh). As a result, the divergence of the value Si and thus the knock decision level $V_{KDi}$ can be effectively prevented.

It is to be appreciated that, since the criterion value Sh is not utilized in FIG. 6 as a limiting factor for updating the value Si, even when the value Si is deviated from the predetermined range (Si<Sh) and the value (2Sh−Si) is used at the step 160 in FIG. 5 for deriving the knock decision level $V_{KDi}$, the value Si is continuously updated in FIG. 6 in a manner to correspond to the standard deviation of the log(Vpi) normal distribution, exceeding the criterion value Sh, until the foregoing disturbance on the left side of the log(Vpi) normal distribution substantially disappears.

Although, in the foregoing preferred embodiment, the knock decision level $V_{KDi}$, the value Si and the value $V_{Mi}$ are derived for each engine cylinder, these values may be derived commonly for all the engine cylinders. Further, the result of the knock detection may be used to control other knock control factors, such as, the air-fuel ratio of the mixture gas to be fed to the engine, instead of controlling the ignition timing as in the foregoing preferred embodiment.

Now, a second preferred embodiment of the knock control system according to the present invention will be described hereinbelow. The following description will mainly refer to what differs from the first preferred embodiment, for avoiding redundant disclosure.

The divergence of the value Si is more likely to happen when the knock is concentrated to a particular engine cylinder. Accordingly, in this preferred embodiment, the dispersion of the values Si for the respective engine cylinders is controlled to be within a predetermined rage by employing the fact that only the value Si for that particular engine cylinder increases significantly.

Figure 10:
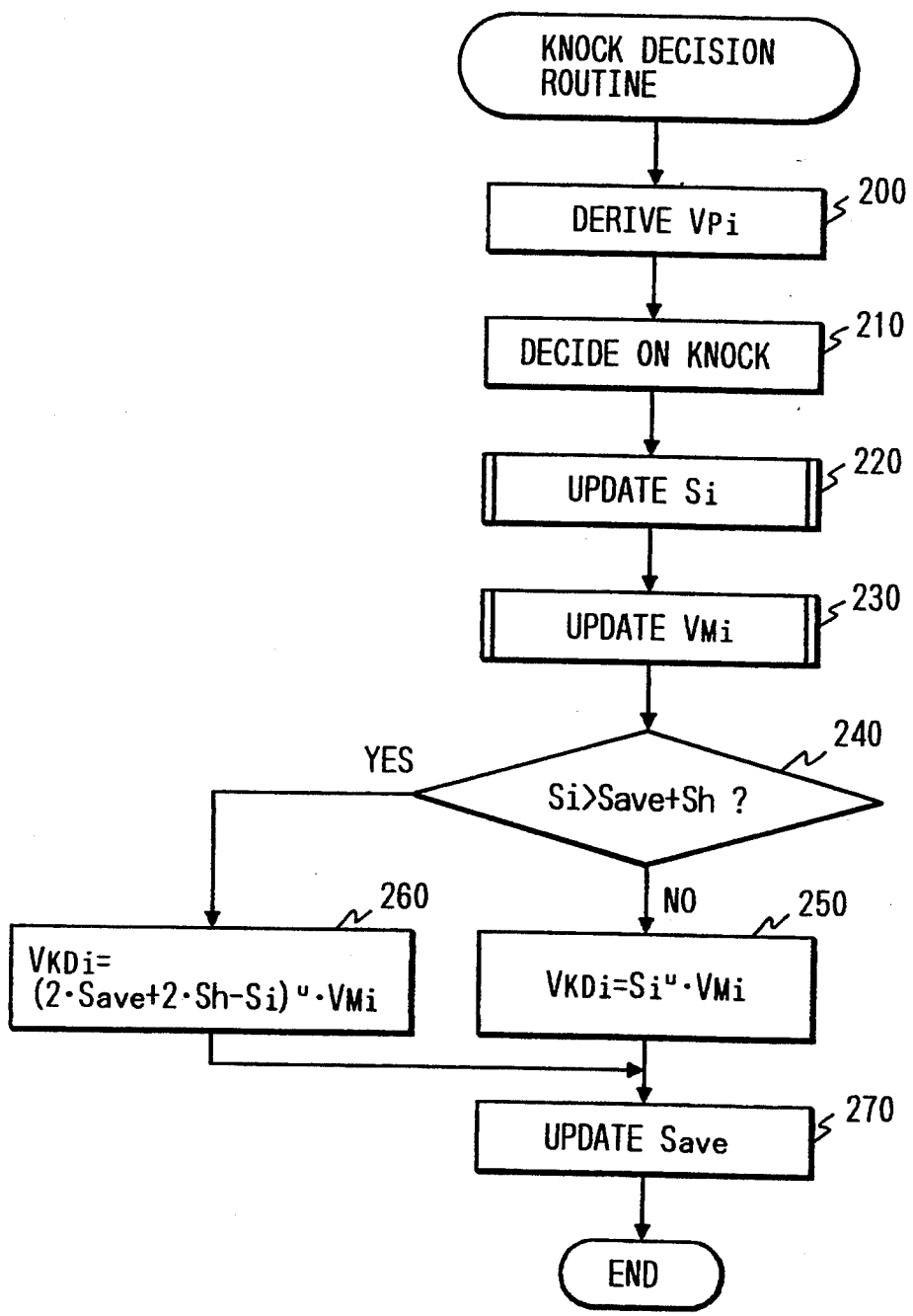
FIG. 10 is a flowchart showing a knock decision routine according to a second preferred embodiment of the present invention.

FIG. 10 shows a flowchart to be executed by the microcomputer 9 per ignition for detecting the engine knock.

The microcomputer 9 derives the knock intensity value Vpi at a first step 200, and determines the presence or absence of the knock at step 210. At a subsequent step 220, the value Si for the corresponding engine cylinder is updated. Since the process executed at step 220 is the same as that shown in FIG. 6, no further explanation thereof will be given hereinbelow. Subsequently, the value $V_{Mi}$ is updated at step 230. Since the process executed at step 230 is the same as that shown in FIG. 8, no further explanation thereof will be given hereinbelow, either.

Subsequently, the routine proceeds to step 240 where the value Si is compared with a criterion value which is a sum of a value Save and a predetermined value Sh as expressed by (Save+Sh). The value Save is an arithmetic mean value of the values S1, S2, S3 and S4 in case of the four-cylinder engine. The predetermined value Sh may be preferably set to about 0.25 in view of a result of various experiments. When answer at step 240 is NO, i.e. the value Si is not lager than the value (Save+Sh), it is judged that no divergence is predicted so that the knock decision level $V_{KDi}$ is derived in the normal manner at a step 250. Specifically, the knock decision level $V_{KDi}$ is derived by the following equation:

$$V_{KDi} = Si^u \bullet V_{mi}$$

wherein "u" represents a constant and may be set, for example, to 3 (u=3).

On the other hand, when answer at the step 240 is YES, i.e. the value Si is larger than the criterion value (Save+Sh), then it is judged that the divergence is predicted so that a reduced value is used for deriving the knock decision level $V_{KDi}$ at step 260. Specifically, step 260 derives the knock decision level $V_{KDi}$ using the following equation:

$$V_{KDi} = (2 \bullet Save + 2 \bullet Sh - Si)^u \bullet V_{Mi}$$

wherein, "u" represents a constant and may be set, for example, to 3 (u=3).

The value (2•Save+2•Sh−Si) is derived by subtracting a balance Si−(Save+Sh) from the criterion value (Save+Sh).

Subsequently, at step 270, the arithmetic mean value Save is updated with the value Si which has been updated at step 220, to be used at step 240 in a subsequent execution cycle of this routine.

As appreciated from the foregoing description, in the second preferred embodiment, the knock decision level $V_{KDi}$ is derived based on the value Si corresponding to the standard deviation of the log(Vpi) distribution and the value $V_{Mi}$ corresponding to the media value of the log(Vpi) distribution when the value Si is within the allowable dispersion range of the values Si for the respective engine cylinders (Si≦Save+Sh). On the other hand, when the value Si is outside the allowable dispersion range (Si>Save+Sh), the knock decision level $V_{KDi}$ is derived based on the value $V_{Mi}$ and the value (2•Save+2•Sh−Si) which is derived by subtracting the balance Si−(Save+Sh) from the criterion value (Save+Sh). As a result, the divergence of the knock decision level $V_{KDi}$ is effectively prevented even when the knock is concentrated to a particular engine cylinder.

Figure 11:
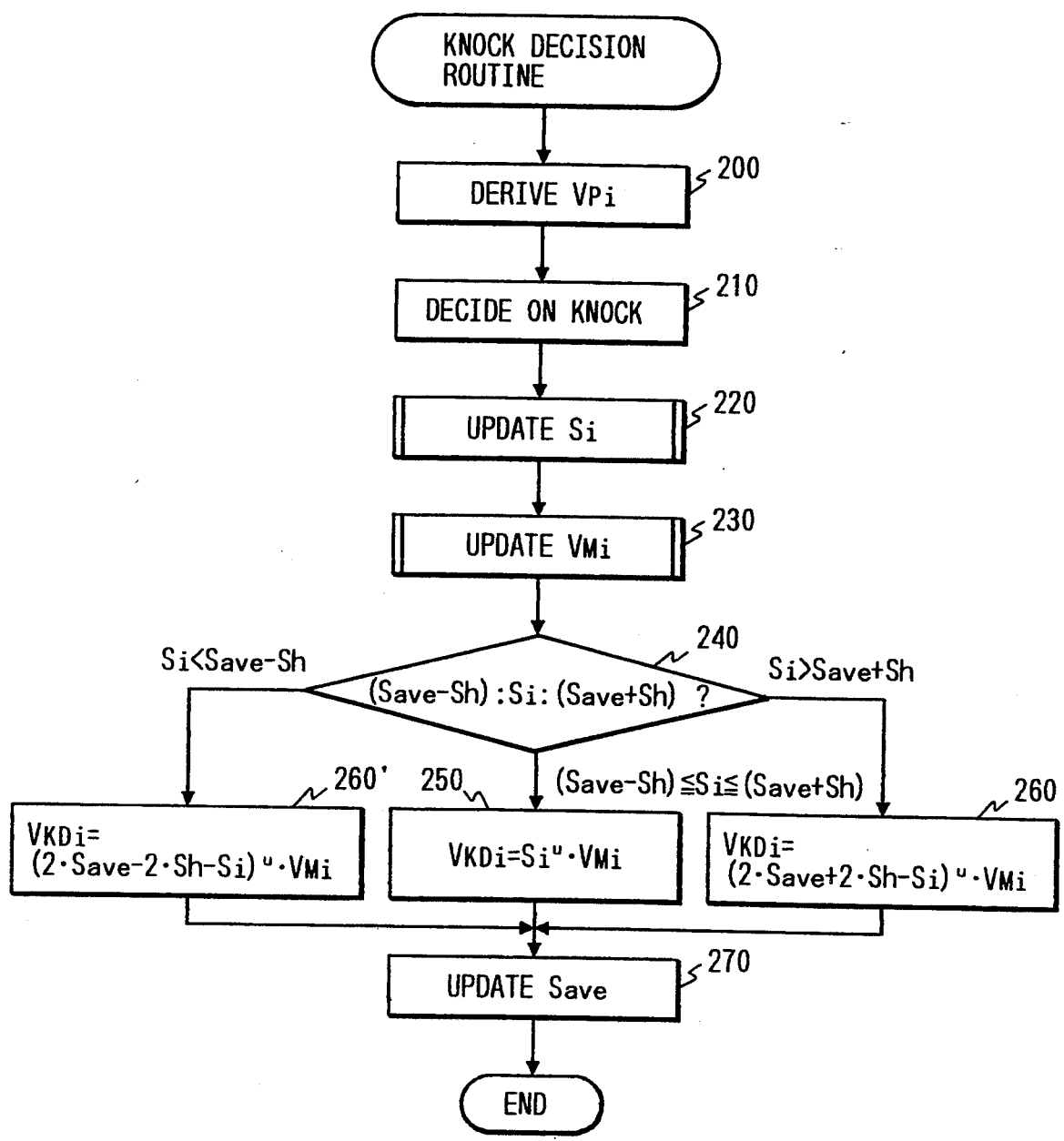
FIG. 11 is a flowchart showing a knock decision routine according to a modification of the second preferred embodiment of the present invention.
Figure 12:
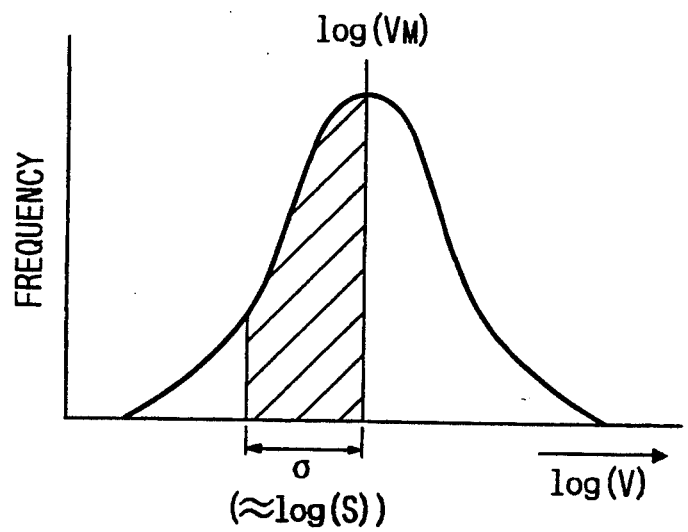
FIG. 12 is a diagram showing a distribution of the logarithmic conversion value of the peak value when no engine knock is generated.
Figure 13:
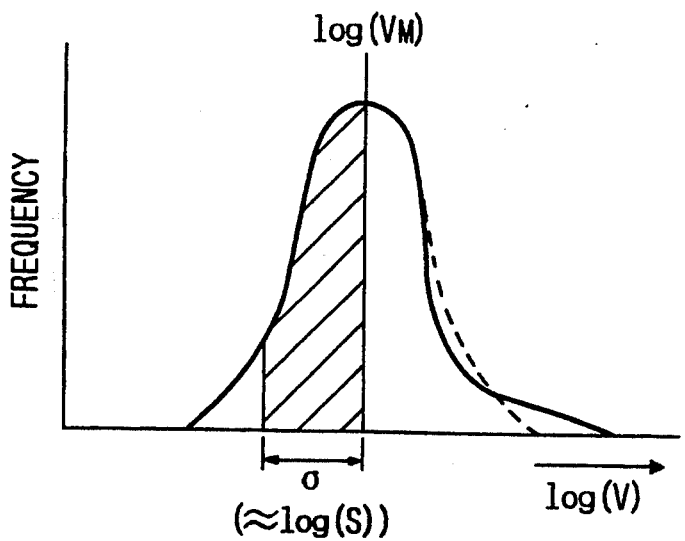
FIG. 13 is a diagram showing a distribution of the logarithmic conversion value of the peak value when a normal engine knock is generated.
Figure 14:
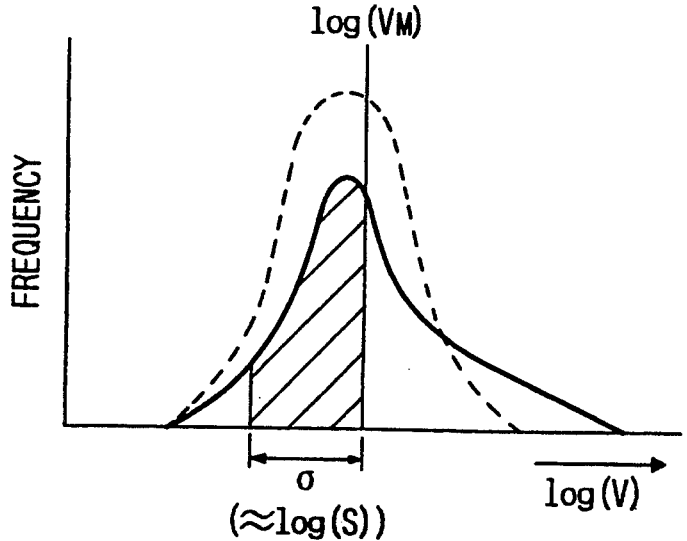
FIG. 14 is a diagram showing a distribution of the logarithmic conversion value of the peak value when a particular engine knock is generated.

FIG. 11 shows a modification of the second preferred embodiment.

Specifically, in this modification, step 240 compares the value Si with the criterion value (Save+Sh) and with a criterion value (Save−Sh). When step 240 decides that a condition (Save−Sh)≦Si≦(Save+Sh) is satisfied, then it is judged that no divergence is predicted so that step 250 derives the knock decision level $V_{KDi}$ in the normal manner, i.e. using the equation $V_{KDi}=Si^u \cdot V_{Mi}$. On the other hand, when step 240 determines a condition Si>(Save+Sh), then it is judged that the divergence is predicted so that step 260 derives the knock decision level $V_{KDi}$ using the equation $V_{KDi}=(2\cdot Save+2\cdot Sh-Si)^u \cdot V_{Mi}$. Further, when step 240 determines a condition Si<(Save−Sh), then it is judged that the divergence is predicted due to the value Si being too small so that step 260' uses an increased value (2•Save−2•Sh−Si) for deriving the knock decision level $V_{KDi}$. The increased value is derived by adding a balance (Save−Sh)−Si to the criterion value (Save−Sh). The knock decision level $V_{KDi}$ is derived by the following equation:

$$V_{KDi}=(2\cdot Save-2\cdot Sh-Si)^u \cdot V_{Mi}$$

As a result, the divergence of the knock decision level $V_{KDi}$ is effectively prevented.

It is to be understood that this invention is not to be limited to the preferred embodiments and modifications described above, and that various changes and modifications may be made without departing from the spirit and scope of the invention as defined in the appended claims.

What is claimed is:

1. A knock control system for an internal combustion engine comprising:
   a knock sensor for detecting knock of the engine and for producing a signal representative of the knock;
   means for deriving a knock intensity value effective for knock detection from said signal produced by the knock sensor;
   knock determining means for determining presence of the knock of the engine by comparing the knock intensity value with a knock threshold level;
   means for controlling a knock control factor based on a result of said comparing by said knock determining means;
   means for determining a first value corresponding to a standard deviation of a distribution of a substantially logarithmic conversion value of the knock intensity value;
   means for determining a second value corresponding to a predetermined cumulative relative frequency of the distribution of the substantially logarithmic conversion value of the knock intensity value;
   first knock level determining means for determining said knock threshold level based on said first and second values when said first value is within an allowable range having a size defined by a predetermined value; and
   second knock level determining means for determining said knock threshold level based on said second value and a third value derived by subtracting a predetermined weighting of said first value and said predetermined value from the predetermined value when said first value deviates from said allowable range.

2. The knock control system as set forth in claim 1, wherein said means for determining said first value continuously updates said first value in a manner to correspond to said standard deviation so that said predetermined value is exceeded even when said second knock level determining means determines said knock threshold level with said first value deviating from said allowable range.

3. The knock control system as set forth in claim 1, wherein said second value corresponds to a median value of said distribution, and wherein said first knock level determining means includes means for calculating said knock level based on the following equation:

$$V_{KDi}=Si^u \cdot V_{mi}$$

wherein, $V_{KDi}$ represents the knock threshold level, Si represents the first value, u represents a given value, and $V_{Mi}$ represents the second value, and
   wherein said second knock level determining means includes means for calculating said knock level based on the following equation:

$$V_{KDi}=(2\cdot Sh-Si)^u \cdot V_{Mi}$$

wherein, $V_{KDi}$ represents the knock threshold level, Sh represents the predetermined value of the allowable range, Si represents the first value, u represents the given value, and $V_{Mi}$ represents the second value.

4. A knock control system for an internal combustion engine, comprising:
   a knock sensor for detecting knock of the engine and for producing a signal indicative of the knock;
   means for determining a knock intensity value effective for knock detection from said signal produced by the knock sensor;
   knock determining means for determining presence of the knock of the engine by comparing the knock intensity value with a knock threshold level for each engine cylinder;
   means for controlling a knock control factor based on a result of the said comparison by said knock determining means;

means for determining a first value, for each engine cylinder, which corresponds to a standard deviation of a distribution of a substantially logarithmic conversion value of the knock intensity value;

means for determining a second value, for each engine cylinder, which corresponds to a predetermined cumulative relative frequency of the distribution of the substantially logarithmic conversion value of the knock intensity value;

first knock level determining means for determining said knock threshold level, for each engine cylinder, based on said first and second values when said first value is within an allowable dispersion range of said first values for each respective engine cylinder; and second knock level determining means for determining said knock threshold level based on said second value and a third value corrected in a manner to fall within said allowable dispersion range when said first value deviates from said allowable dispersion range.

5. The knock control system as set forth in claim 4, wherein said means for determining said first value continuously updates said first value in a manner to correspond to said standard deviation so that said predetermined value is exceeded even when said second knock level determining means determines said knock threshold level with said first value deviating from said allowable dispersion range.

6. The knock control system as set forth in claim 4, wherein said second knock level determining means calculates said third value by subtracting a predetermined weighting of said first value and a predetermined value from said predetermined value.

7. The knock control system as set forth in claim 6, wherein said second value corresponds to a median value of said distribution, and wherein said first knock level determining means includes means for determining said knock threshold level based on the following equation:

$$V_{KDi} = Si^u \bullet V_{Mi}$$

wherein, $V_{KDi}$ represents the knock threshold level, Si represents the first value, u represents a given value, and $V_{Mi}$ represents the second value, and wherein said second known level determining means includes means for calculating said knock threshold level based on the following equation:

$$V_{KDi} = (2 \bullet Save + 2 \bullet Sh - Si)^u \bullet V_{Mi}$$

wherein, $V_{KDi}$ represents the knock threshold level, Save represents a mean value of the first values for each respective engine cylinder, Sh represents a preset value, Si represents the first value, u represents the given value, and $V_{Mi}$ represents the second value.

8. The knock control system as set forth in claim 4, wherein said second value corresponds to a median value of said distribution, and wherein said first known level determining means includes means for calculating said knock threshold level based on the following equation:

$$V_{KDi} = Si^u \bullet V_{Mi}$$

wherein, $V_{KDi}$ represents the knock threshold level, Si represents the first value, u represents a given value, and $V_{Mi}$ represent the second value, and wherein said second knock level determining means includes means for calculating said knock threshold level based on the following equation when said first value is larger than said allowable dispersion range:

$$V_{KDi} = (2 \bullet Save + 2 \bullet Sh - Si)^u \bullet V_{Mi}$$

wherein, $V_{KDi}$ represents the knock threshold level, Save represents a mean value of the first values for each respective engine cylinder, Sh represents a preset value, Si represents the first value, u represents the given value, and $V_{Mi}$ represents the second value, and wherein said second knock value determining means further includes means for calculating said knock level based on the following equation when said first value is smaller than said allowable dispersion range:

$$V_{KDi} = (2 \bullet Save - 2 \bullet Sh - Si)^u \bullet V_{Mi}$$

wherein, $V_{KDi}$ represents the knock threshold level, Save represents the mean value of the first values for each respective engine cylinder, Sh represents the preset value, Si represents the first value, u represents the given value, and $V_{Mi}$ represents the second value.

* * * * *